US009722877B2

(12) United States Patent
Uberoy et al.

(10) Patent No.: US 9,722,877 B2
(45) Date of Patent: Aug. 1, 2017

(54) METHOD AND APPARATUS FOR MANAGING VIRTUAL NETWORKS VIA CLOUD HOSTED APPLICATION

(71) Applicants: Pawan Uberoy, San Jose, CA (US); Praveen Madhav, San Jose, CA (US)

(72) Inventors: Pawan Uberoy, San Jose, CA (US); Praveen Madhav, San Jose, CA (US)

(73) Assignee: Viasat, Inc., Carlsbad, CA (US)

( * ) Notice: Subject to any disclaimer, the term of this patent is extended or adjusted under 35 U.S.C. 154(b) by 92 days.

(21) Appl. No.: 14/485,232

(22) Filed: Sep. 12, 2014

(65) Prior Publication Data

US 2016/0080172 A1   Mar. 17, 2016

(51) Int. Cl.
 *H04L 12/24* (2006.01)

(52) U.S. Cl.
 CPC .......... *H04L 41/12* (2013.01); *H04L 41/0843* (2013.01)

(58) Field of Classification Search
 CPC ..... H04L 67/10; H04L 41/0843; H04L 41/12; G05B 19/4185; G06F 9/45558; G06Q 10/06
 USPC .......................................................... 370/254
 See application file for complete search history.

(56) References Cited

U.S. PATENT DOCUMENTS

| | | | | |
|---|---|---|---|---|
| 9,151,495 | B1* | 10/2015 | Archer | F23G 7/085 |
| 2011/0265077 | A1* | 10/2011 | Collison | G06F 8/71 |
| | | | | 717/172 |
| 2012/0030672 | A1* | 2/2012 | Zygmuntowicz | G06F 8/60 |
| | | | | 718/1 |
| 2012/0266156 | A1* | 10/2012 | Spivak | G06F 9/5055 |
| | | | | 717/172 |
| 2013/0174063 | A1* | 7/2013 | Chmiel | G06Q 10/06 |
| | | | | 715/762 |
| 2013/0212129 | A1* | 8/2013 | Lawson | G05B 19/4185 |
| | | | | 707/779 |
| 2013/0227089 | A1* | 8/2013 | McLeod | G06F 9/45558 |
| | | | | 709/220 |
| 2013/0275596 | A1* | 10/2013 | Subramaniam | H04L 41/04 |
| | | | | 709/226 |
| 2013/0290511 | A1* | 10/2013 | Tu | G06F 9/5072 |
| | | | | 709/224 |
| 2014/0115168 | A1* | 4/2014 | Yamashima | G06F 9/5077 |
| | | | | 709/226 |
| 2014/0122724 | A1* | 5/2014 | Zhang | H04L 49/70 |
| | | | | 709/226 |
| 2015/0295792 | A1* | 10/2015 | Cropper | H04L 67/10 |
| | | | | 709/226 |

* cited by examiner

*Primary Examiner* — Jianye Wu
(74) *Attorney, Agent, or Firm* — James M. Wu; JW Law Group

(57) ABSTRACT

An apparatus and method for providing a cloud hosted application able to manage virtual network ("VN") is disclosed. In one embodiment, a process of managing VN using virtual machines ("VMs") receives a message or request from a user requesting a new VN to be built. The request is sent from a dashboard to a network orchestrator via a communication network. The orchestrator is a VN manager able to facilitate building a VN based on users' input. In one aspect, the orchestrator provides a set of templates that represent VN devices or components to users for facilitating construction of VN. After configuring a VN, a cloud capable of hosting the network is selected. The network or VN is subsequently launched using at least a portion of computing resources allocated in the cloud.

17 Claims, 7 Drawing Sheets

METHOD AND APPARATUS FOR MANAGING VIRTUAL NETWORKS VIA CLOUD HOSTED APPLICATION

FIELD

The exemplary embodiment(s) of the present invention relates to communications network. More specifically, the disclosed embodiment(s) of the present invention relates to virtual network.

BACKGROUND

With increasing popularity of electronic devices, such as computers, smart phones, mobile devices, server farms, mainframe computers, and the like, the demand for more and faster digital information is constantly growing. To handle and facilitate voluminous digital data between end users and content providers, high-speed and high-capacity computer networks are typically required. A conventional computer network or telecommunications network, which is capable of transporting information between multiple sources and destinations, includes a set of sophisticated network devices. Various network components and/or devices, such as radio towers, base stations, gateways, access switches, routers, bridges, and the like, are interconnected to form a network configuration capable of delivering information from a source to a destination.

Since a communication network involves many complex devices, nodes, and interconnections, managing, maintaining, and/or developing a network becomes increasingly challenging and expensive.

SUMMARY

One embodiment of the present invention discloses a cloud based application able to provide virtual network ("VN") management. In one embodiment, a process of managing VN using virtual machines ("VMs") receives a message or request from a user requesting a new VN to be built. The request is sent from a web-based dashboard to a network orchestrator via a communication network. The orchestrator is a VN manager able to facilitate building a VN based on users' input. In one aspect, the orchestrator provides a set of templates that represent VN devices or physical components to users for facilitating construction of VN. After configuring a VN, a cloud capable of hosting the network is selected. The network or VN is subsequently launched using at least a portion of computing resources allocated in the cloud.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
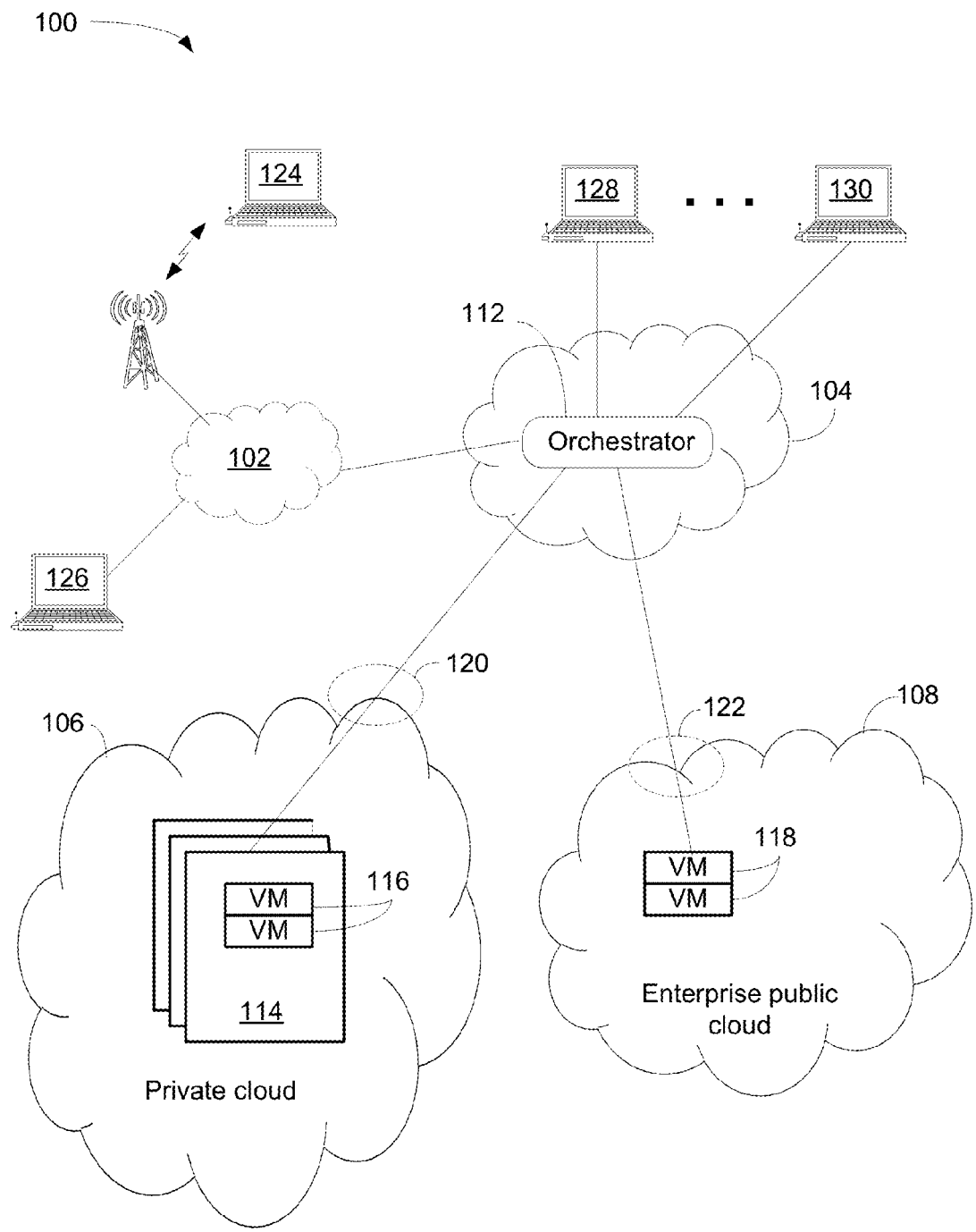
FIG. 1 is a block diagram illustrating an orchestrator able to manage one or more network clouds in a network configuration in accordance with one embodiment of the present invention.

Exemplary embodiment(s) of the present invention is described herein in the context of a method, device, and apparatus for managing virtual networks ("VNs") via a cloud based application.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "system" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network able to transmit data in the form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

One embodiment of the present invention discloses a cloud hosted application used to manage cloud based virtual network ("VN"). In one aspect, a network orchestrator that resides in one cloud or network is able to manage multiple virtual machines ("VMs") as well as physical machines running at multiple clouds. For example, the orchestrator is capable of receiving a request for building a VN from a user using a dashboard through a communication network. The orchestrator, which is a VN manager, is able to provide a set of templates that represent various VN devices and/or components to facilitate construction of the requested VN. After configuring the requested VN having at least one VM for performing at least one network function, a cloud capable of hosting the requested network is selected. The VN is subsequently launched using at least a portion of computing resources allocated in the cloud.

FIG. 1 is a block diagram 100 illustrating an orchestrator able to manage one or more network clouds in a network configuration in accordance with one embodiment of the present invention. Diagram 100 includes a network or cloud 102, private network or cloud 106, and public cloud 108. Note that the terms "network" and "cloud" can be used interchangeably to indicate a group of hardware and software devices connected with each other to form a networking function(s). Cloud 104, which can be either a private cloud or public cloud, contains or hosts orchestrator 112. Orchestrator 112, in one aspect, is coupled to various users 124-130 via one or more clouds and/or networks such as cloud 102. It should be noted that the underlying concept of the exemplary embodiment(s) of the present invention would not change if one or more blocks (or devices) were added to or removed from diagram 100.

A cloud is cloud computing and includes a cluster of servers residing in a network. The servers in the cloud are able to support or host multiple VMs running simultaneously. Cloud computing basically uses various resources including hardware, firmware, and software to deliver computing service. A benefit for using the cloud is that it shares resources with other users so that resources can be used more efficiently. Another benefit of using a cloud is that it is able to dynamically reallocate resources on demand.

One advantage of using a cloud to operate a VN using multiple VMs is that the traditional dedicated hardware for a network such as routers and switches are not required. If, however, the traditional hardware is present, they can be used in conjunction with the VN.

A cloud can be a private cloud, a public cloud, or a hybrid cloud. A private cloud such as cloud 106 is operated for an individual or single or corporation, organization, and/or entity. The private cloud, in one example, provides cloud-computing services over a network to the entity. Note that a private cloud can be managed or hosted internally, externally, or both. Cloud 106, for example, includes a set of servers 114 capable of virtualizing various assigned operations and/or executions using a group of VMs 116.

A public cloud such as enterprise public cloud 108 that is open to the public provides cloud computing services over a communications network. A public cloud, which is also known as community cloud, can be free or based on a fee schedule in exchange of clouding service. For example, exemplary public cloud service providers, such as Amazon web services (AWS)™, Microsoft, Apple, and/or Google, are hosting web services across Internet. Enterprise public cloud 108, in one aspect, includes an array of servers capable of hosting and supporting a set of VMs 118 running simultaneously.

Hybrid cloud, in one example, is a combination of multiple clouds including private and public clouds. In an alternative example, a hybrid cloud includes VMs as well as physical machines in one or more clouds. Hybrid cloud is able to host or support a set of VMs as well as physical machines operating simultaneously.

Orchestrator 112, in one aspect, arranges, coordinates, and manages one or more VNs based on users' requests. In addition to virtualization, orchestrator 112 also provides other network related functions, such as provisioning, workflows, flexible resource allocation, billing, metering, accounting, policies, and user interfaces. To improve network performance, orchestrator 112, in one embodiment, is able to scale up or down based on the needs of VN. The terms "orchestrator," "network orchestrator," and "orchestrator of network," mean the same apparatus and they can be used interchangeably.

A VM is a software implementation of a particular computer system that processes tasks like a real physical machine. For instance, VM can be configured to execute instructions in a way that follows the emulated computer architecture. A server or a cluster of servers containing specialized hardware and software may be used to provide a VM environment that allows multiple VMs to be operated simultaneously. VM includes system virtual machines and process virtual machines. The system virtual machine includes a set of functions operating based on an operating system. The process virtual machine is able to execute a program based on platform-independent program execution environment. Instance means a VM configured to execute program based on the emulation of a real machine or apparatus.

Diagram 100 illustrates a network layout containing orchestrator 112, private cloud 106, public cloud 108, users 124-130 to facilitate network virtualization based on users' input. Private cloud or private network cloud 106 provides network services to a group of remote users across a network. In one aspect, private network cloud 106 is configured to contain a group of servers 114 capable of supporting multiple virtual instances (or VMs) 116 running at the same time or substantially the same time. To communicate with orchestrator 112, private network cloud 106 uses at least one Engreen host manager ("ehm") 120 which can be placed in one of servers 114 to communicate with orchestrator 112.

Public network cloud or enterprise public cloud 108, which is coupled to private network cloud 106 via orchestrator 112, is configured to provide cloud-computing service to remote users based on applications. Based on a requested or desirable or constructed VN, a public network cloud 108 may be selected or chosen to host the requested VN. The requested VN is subsequently launched in public network cloud 108. Public network cloud 108 is able to host and execute VN(s) using various VMs 118 based on the input from user, orchestrator, or both. To communicate with orchestrator 112, public network cloud 108 uses a cloud application-programming interface ("API") 122 to facilitate communication between orchestrator 112 and public cloud 108. A cloud API or APIs can be employed to facilitate establishing virtual applications (or VNs) in a cloud.

Orchestrator 112, in one embodiment, communicates with users 128-130 coupled to orchestrator 112 directly via cloud 104 and users 124-126 coupled to orchestrator 112 via a cloud 102. Some users such as user 124 are connected to orchestrator 112 via a wireless network. Orchestrator 112 is able to manage VMs 116-118 located in clouds 106-108 in response to input from remote users such as user 124 or user 130.

Orchestrator 112, in one embodiment, includes multiple dashboards, not shown in FIG. 1, wherein the dashboards are used to communicate with subscribers or users 124-130 via one or more networks. For example, orchestrator 112 is able to post a set of icons on the dashboards to facilitate user input. The icons, in one embodiment, are templates representing virtual and/or real network devices and/or components. With input from one or more subscribers or users 124-130, orchestrator 112 is able to assist a subscriber to establish a VN based on selected templates via dashboard(s). It should be noted that additional private clouds and/or public clouds may be added in diagram 100. For example, multiple clouds containing different sets of VMs and physical machines may be selected by orchestrator to launch a selected VN. One advantage of using an orchestrator to manage VNs is that the orchestrator may allow a predefined group of subscribes to clone an established network or VN.

In operation, a virtual network management ("VNM") or a cloud based application uses orchestrator 112 to manage and facilitate VNs for various subscribers. The cloud (internet) based application, in one embodiment, instantiates, manages, and controls VNs in private cloud 106 of an enterprise. The application in the cloud, for example, can be a multi-tenant application that is capable of handling users, instances and templates of multiple enterprises at the same time. VNM, in one aspect, allows an enterprise to create virtual networks with virtual appliances on servers in a cloud and allows a virtual appliance to logically couple to enterprise's own networks. Also, the enterprise is allowed to share the template of virtual networks with multiple users.

A virtual appliance is a predefined VM and is able to run on a virtual machine monitor or platform such as a hypervisor. A hypervisor is a combination of computer software, firmware or hardware that is able to host and run VMs. For example, a virtual appliance allows a user to run virtual applications without installation and/or configuration of the virtual machine platform. An advantage of sharing a template of VN is that it allows a group of users to work on a similar network for the same as well as different tasks.

Figure 2:
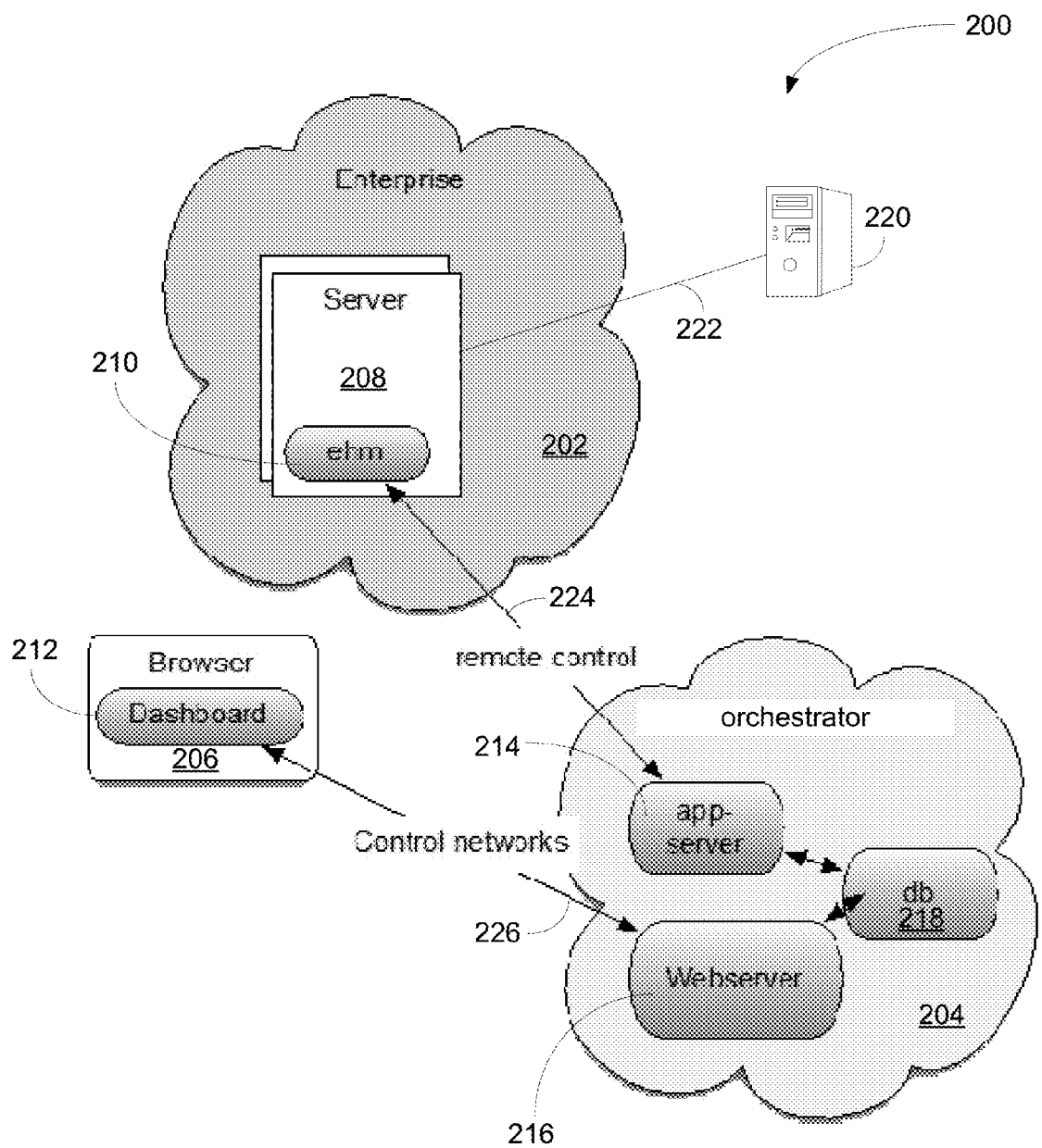
FIG. 2 is a block diagram illustrating an exemplary network configuration having an orchestrator capable of managing and/or launching VNs in accordance with one embodiment of the present invention.

FIG. 2 is a block diagram 200 illustrating an exemplary network configuration having an orchestrator capable of managing and/or launching VNs in accordance with one embodiment of the present invention. Diagram 200 includes an enterprise private cloud 202, orchestrator 204, and dashboard 212 wherein dashboard 212 can be accessed via a browser 206 through a web or Internet connection(s). In one aspect, a physical machine such as system 220 can be coupled to cloud 202 as a part of VN. It should be noted that the underlying concept of the exemplary embodiment(s) of the present invention would not change if one or more blocks (or devices) were added to or removed from diagram 200.

Orchestrator 204, in one embodiment, includes an application server 214, a web server 216, and a database 218, wherein orchestrator 204 may reside in a private, public, micro, or hybrid cloud. Application server 214 is used to communicate with enterprise cloud 202 via network connection 224 wherein connection 224 can be a wired, wireless, or a combination of wired and wireless network connection. A function of application server 214 is to remotely control or manage VN(s) running at cloud 202 via ehm 210. Ehm 210, which may be resided in one or multiple servers 208, is able to report VN status to application server 214 and receives instruction(s) from application server 214.

Web server 216, in one embodiment, is used to communicate with user(s) or subscriber(s) via dashboard(s) 212. In one aspect, Web server 216 is capable of selectively posting icons or templates on dashboard(s) via a wired or wireless connection 226. When a user or subscriber logs into orchestrator 204 via a web browser such as browser 206, dashboard 212 will display various predefined icon images. A function of dashboard 212 is that it allows a subscriber to pick and choose virtual devices represented by the icons to build a unique or requested VN. Alternatively, dashboard 212 may also offer an opportunity for a user or subscriber to clone an existing VN.

Orchestrator 204, which can also be referred to as network orchestrator, network manager, and/or orchestrator of networks, is able to manage virtual devices as well as physical devices. A function of orchestrator 204 is to use various templates and instances to create replicas of entire network(s) using VMs as well as physical devices. Orchestrator 204 can also provide automatic scaling in response to the demand and/or execution of VN(s). An advantage of using an orchestrator is that it provides automatic convergence as well as capabilities in a disaster recovery.

Cloud 202 is similar to cloud 106, shown in FIG. 1, except that cloud 202 is coupled to physical machine 220. In one example, cloud 202 is a private cloud operated by an entity. The entity builds a unique VN to test its network device that may be installed in physical machine 220. After a provisioning process, orchestrator 204 facilitates building a requested VN that integrates physical machine 220 as a part of VN in accordance with the subscriber's request. Once a desirable VN template is built or established, it can be replicated or cloned by other subscribers.

Once a VN template is created, it can be easily copied or duplicated for different users situated in the same or different geographic locations, whereby each user can have an isolated environment to work and/or test the VN. An advantage of providing a cloning capability is to allow different applications to use the same or substantially the same VN. For example a web server may have a web host plus a database for storage. Upon creating of a VN, such instance can easily be cloned for new application.

Figure 3:
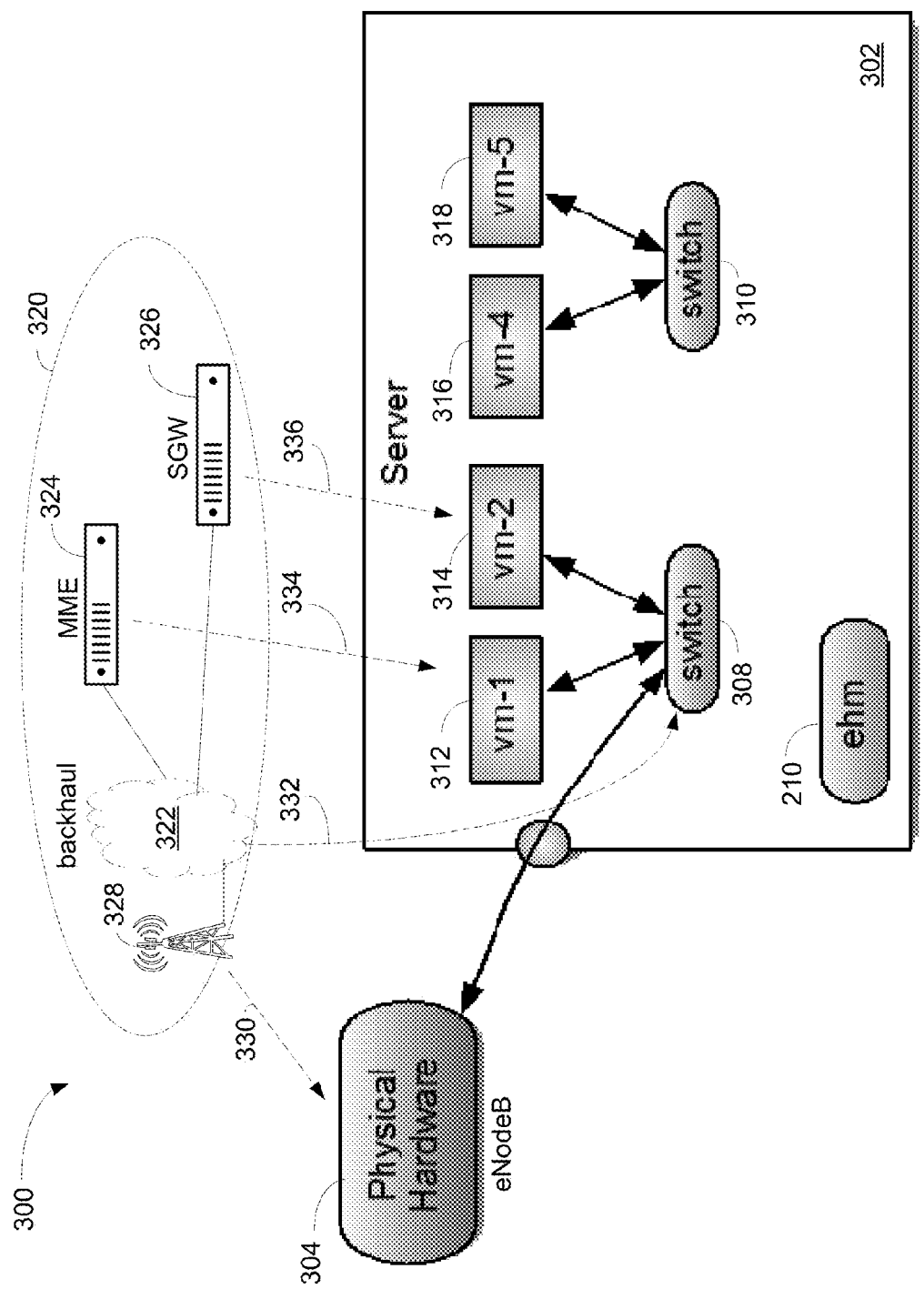
FIG. 3 is a block diagram illustrating an exemplary virtual network configuration having VMs as well as physical hardware in accordance with one embodiment of the present invention.

FIG. 3 is a block diagram 300 illustrating an exemplary virtual network configuration having VMs as well as physical hardware in accordance with one embodiment of the present invention. Diagram 300 includes a server 302 and physical hardware 304 wherein server 302 includes multiple VMs 308-318 and ehm 210. In one embodiment, physical hardware 304 is a base station or eNodeB (Evolution Node B). It should be noted that the underlying concept of the exemplary embodiment(s) of the present invention would not change if one or more blocks (or devices) were added to or removed from diagram 300.

In one exemplary embodiment, VN, which is controlled by the orchestrator, is a mix of virtual appliances such as VMs 312-318, routing instances for switches/bridges such as VMs 308-310. The VN can be used to connect to a real hardware including real devices such as eNodeB 304. The VN can include virtual devices that are hosted on the same physical server as well as a remote server situated across a network. It should be noted that other physical hardware devices could also be connected or added to the VN.

During an operation, a subscriber or user can test eNodeB 304 using VN 320. After connecting eNodeB 304 to VM switch 308, the subscriber works with the orchestrator to assign VM switch 308 as a virtual backhaul 322, VM 312 as a virtual mobility management entity ("MME") 324, and VM 314 as a virtual serving gateway ("SGW") 326 as indicated by dotted arrows 332-336. Upon launching VN 320 in a cloud, a virtual network having a physical eNodeB 304 is established. Once VN 320 is operational, the subscriber can test functionalities of eNodeB 304 once eNodeB 304 begins to communicate with virtual tower 328 via wireless connection 330.

MME 324, in one example, facilitates data transfer, idle mode, tracking, paging, retransmitting, network security management as well as resource allocations. SGW 326 is generally configured to perform various functions, such as authenticating device identity, terminating paths, paging idling UEs, storing data, routing information, and the like.

Figure 4:
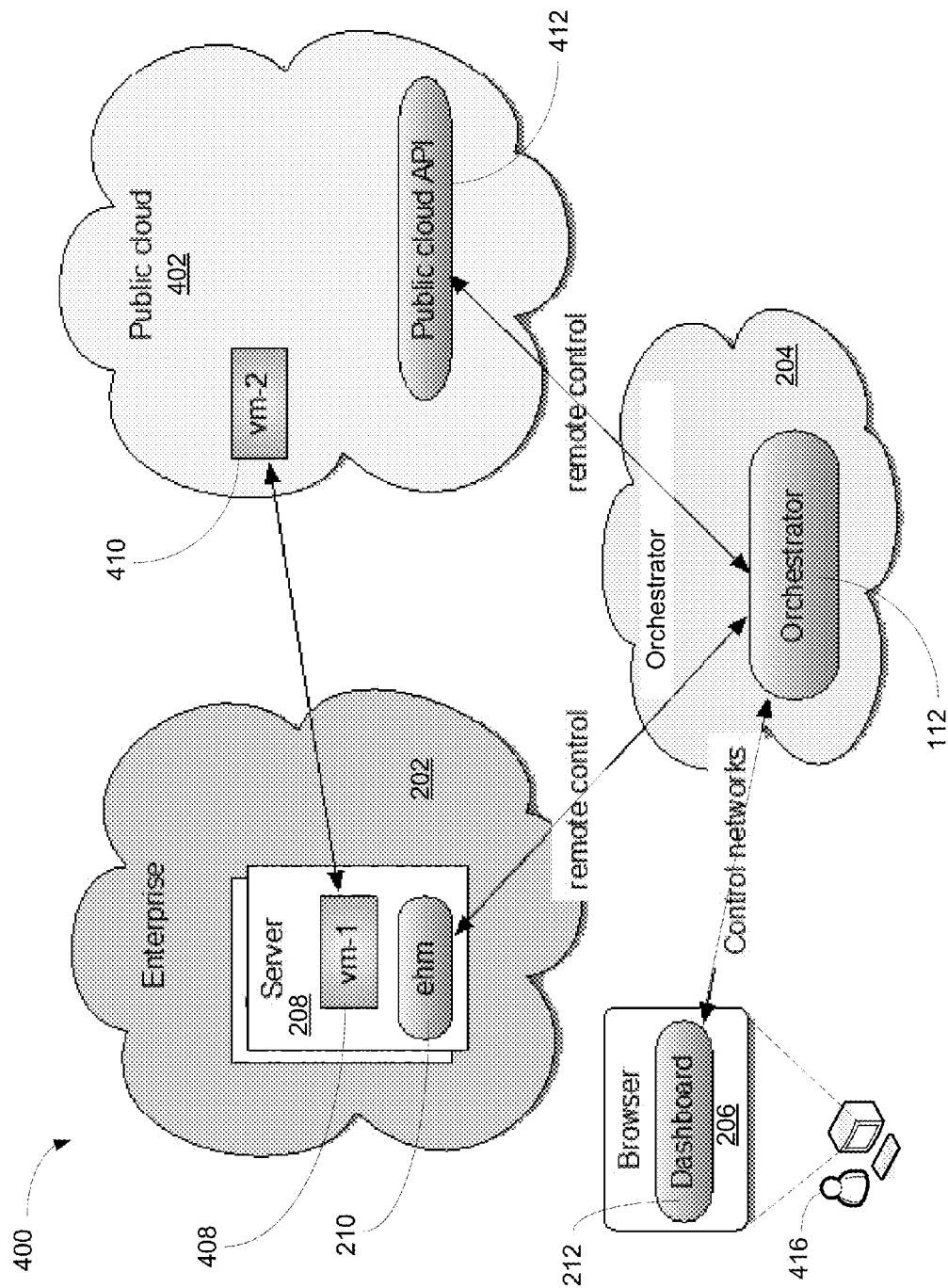
FIG. 4 is a block logic diagram illustrating an exemplary virtual network configuration capable of managing multiple virtual machines using multiple clouds in accordance with one embodiment of the present invention.

FIG. 4 is a block logic diagram 400 illustrating an exemplary VN configuration capable of managing multiple VMs using multiple clouds in accordance with one embodiment of the present invention. Diagram 400, which is similar to diagram 200, includes public cloud 402, enterprise private cloud 202, orchestrator 204, and dashboard 212 wherein dashboard 212 can be accessed via a browser 206 through a web connection(s). In one aspect, dashboard 212 can be displayed in a subscriber's monitor 416 via a browser. It should be noted that the underlying concept of the exemplary embodiment(s) of the present invention would not change if one or more blocks (or devices) were added to or removed from diagram 400.

Orchestrator 112, which is hosted by a micro cloud 204, is capable of automatically scaling or adjusting computing power on demand. For example, orchestrator 112 is able to launch VM 410 in public cloud 402 to scale up computing power originally provided by VM 408 for a VN. It should be noted that orchestrator 112 could launch additional VMs as needed in any clouds including cloud 202.

In one aspect, the enterprise can choose or decide whether a public, a private, or a hybrid cloud should be used to host its VN. When the orchestrator detects a degradation of VN's performance, the orchestrator can spin up instances to improve VN's performance. To improve resource allocation, the instances can be relocated to other geographical locations during time of day where a less expensive or less utilized server time may be found. For example, orchestrator 112 can be configured to transfer images to other public clouds using APIs without running the ehm.

During an operation, VM 408, for example, performs a function of evolved packet core ("EPC") within a virtual network. Upon detecting an increasing in computing demand in VM 408, orchestrator 112 launches a second VM 410 as MME to relieve at least a portion of the computing power from VM 408. Orchestrator 112 can continue launching VMs across various clouds until the demand of computing power is met. Orchestrator 112 can also scale down the computing power once the demand for computing power reduces or diminishes.

Figure 5:
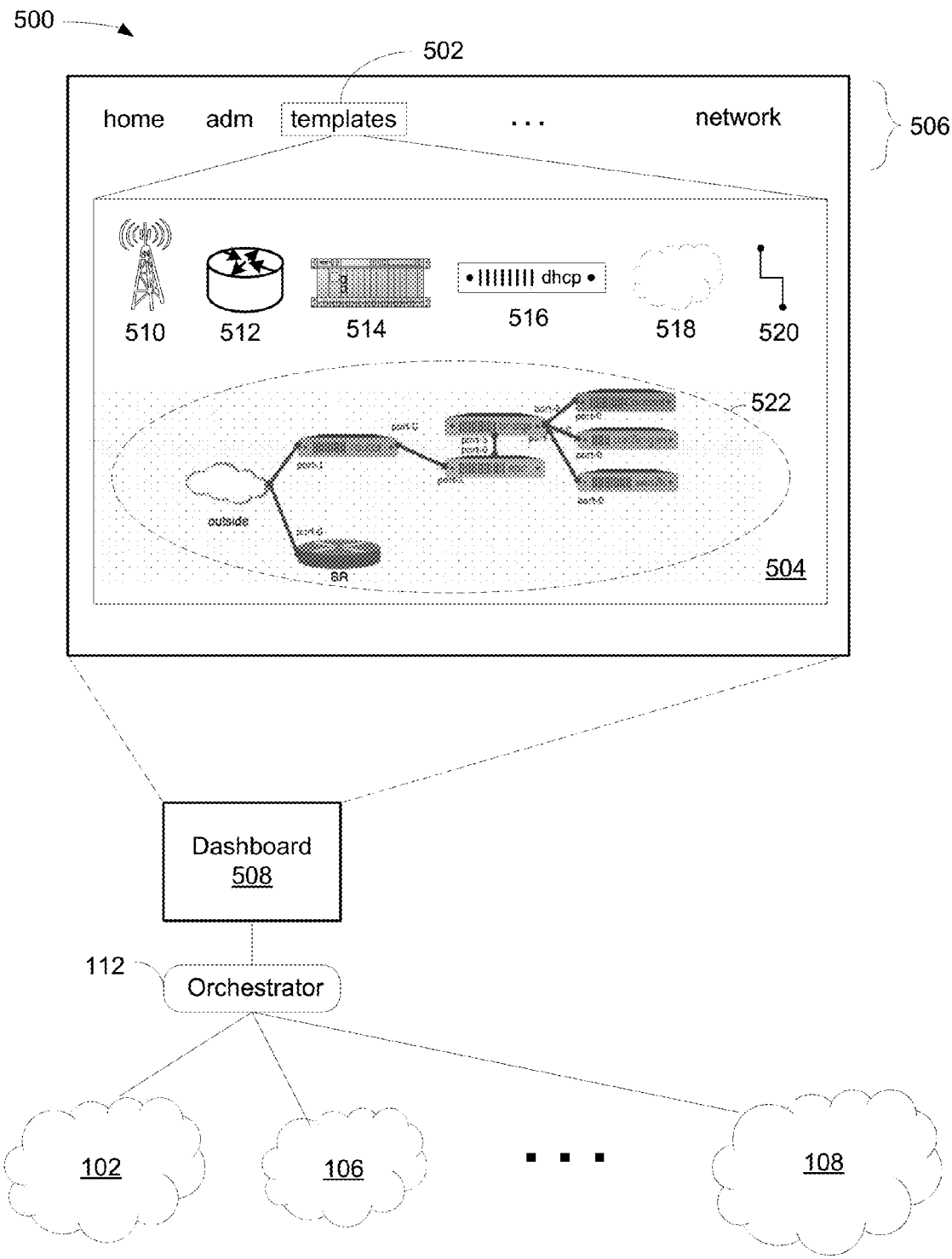
FIG. 5 is a block diagram illustrating an exemplary dashboard 508 managed by orchestrator in accordance with one embodiment of the present invention.

FIG. 5 is a block diagram 500 illustrating an exemplary dashboard 508 managed by orchestrator in accordance with one embodiment of the present invention. Diagram 500 includes clouds 102-108, orchestrator 112, and dashboard 508. Dashboard 508, in one embodiment, includes a toolbar 506, template 502, and pull-down menu 504. Toolbar 506 lists various buttons representing various important functions such as home button and template 502. It should be noted that the underlying concept of the exemplary embodiment(s) of the present invention would not change if one or more blocks (or devices) were added to or removed from diagram 500.

Pull-down menu 504 illustrates multiple icons 510-522 representing various virtual network related devices or components when template 502, for example, is clicked. Menu 504 lists various icons, such as tower 510, router 512, rack 514, network device 516, cloud 518, connection 520, and VN template 522. A subscriber or user can selectively pick and choose any icons to build a desirable virtual network. Once a set of icons is selected, orchestrator will select one of clouds 102-108 to launch the selected VN. Depending on the applications, orchestrator 112 may scan up or down depending on the demand of computing power in accordance with the selected VN.

The network templates can be drawn or constructed by an administrators or knowledgeable people. Such network templates such as template 522 can be subsequently shared with the rest of the users or team. The users can create an instance from the existing template such as template 522 to build a VN system. The templates can be shared with multiple communities as a standard application for a common task. In one aspect, orchestrator 112 is able to control and authenticate which user or users can share the network templates, constructed VNs, and/or templates. In another aspect, orchestrator 112 is able to authenticate users via an external mechanism like a third party Single Sign On ("SSO") service.

Figure 6:
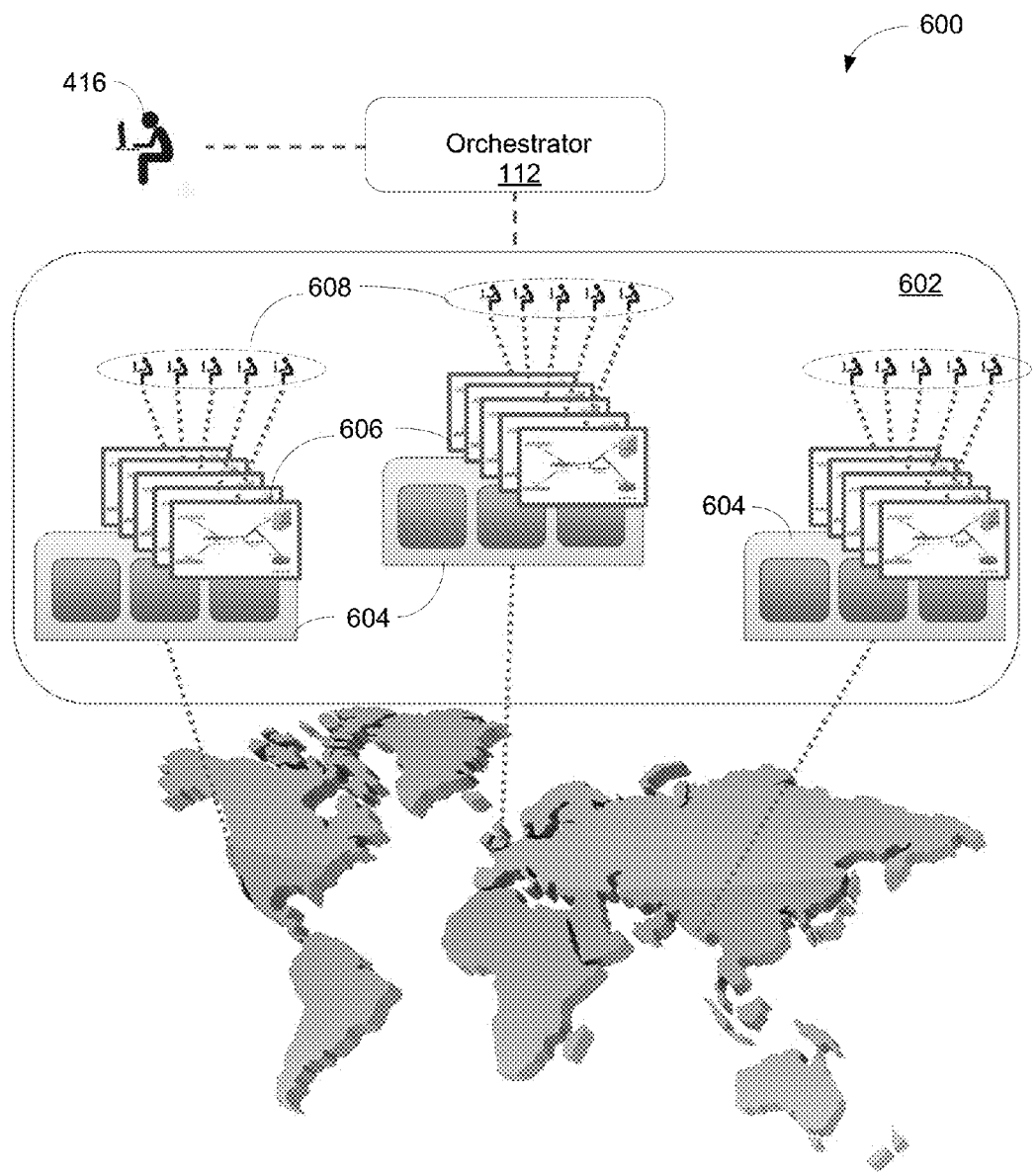
FIG. 6 is a block diagram illustrating an exemplary virtual network using shared resources managed by an orchestrator in accordance with one embodiment of the present invention.

FIG. 6 is a block diagram 600 illustrating an exemplary virtual network using shared resources managed by an orchestrator in accordance with one embodiment of the present invention. Diagram 600 includes subscriber 416, orchestrator 112, and VN 602. Subscriber 416 has three work groups or teams 608 located in North America, Europe, and Asia. Each work group 608 is able to use the same set of generic hardware and/or cloud 604 managed by orchestrator 112.

One advantage of using orchestrator to distribute a set of composed or constructed VNs across several geographic locations is that it can leverage computing resources over different time zones. For example, a cloud computer facility that serves European users during European time zone can reallocate the same resources to serve North American users during the North America daytime working hours. Leveraging computing resources across different time zones can optimize usage of computing resources and, thus improves overall cloud efficiency.

In one embodiment, an orchestrator, which is a cloud hosted application, is able to monitor system performance associated with a configured VN based on VMs running in at the first cloud. A configured, constructed, or running VN is a selected VN based on a user's request. After issuing a scale-up request in response to the system performance, the orchestrator determines whether a separable VN device can be identified from the configured VN. For example, a virtual MME is a separable network element in a virtual EPC. Upon separating the separable VN device from the configured VN, a second VM is subsequently launched as a virtual separable VN device. For example after the virtual MME is separated from the virtual EPC, a new VM is launched as the new virtual MME, whereby overall performance of the VN is improved.

The orchestrator, in one embodiment, is configured to continuously receive performance status from various VMs that performs various functions in view of the configured VN. A scale-down request may be issued by the orchestrator in accordance with the system performance. After identifying a combinable VN device in the configured VN, a VM for the combinable VN device is released as soon as the combinable VN device is merged with other VN devices in the VN.

The exemplary aspect of the present invention includes various processing steps, which will be described below. The steps of the aspect may be embodied in machine, router, or computer executable instructions. The instructions can be used to create a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 7:
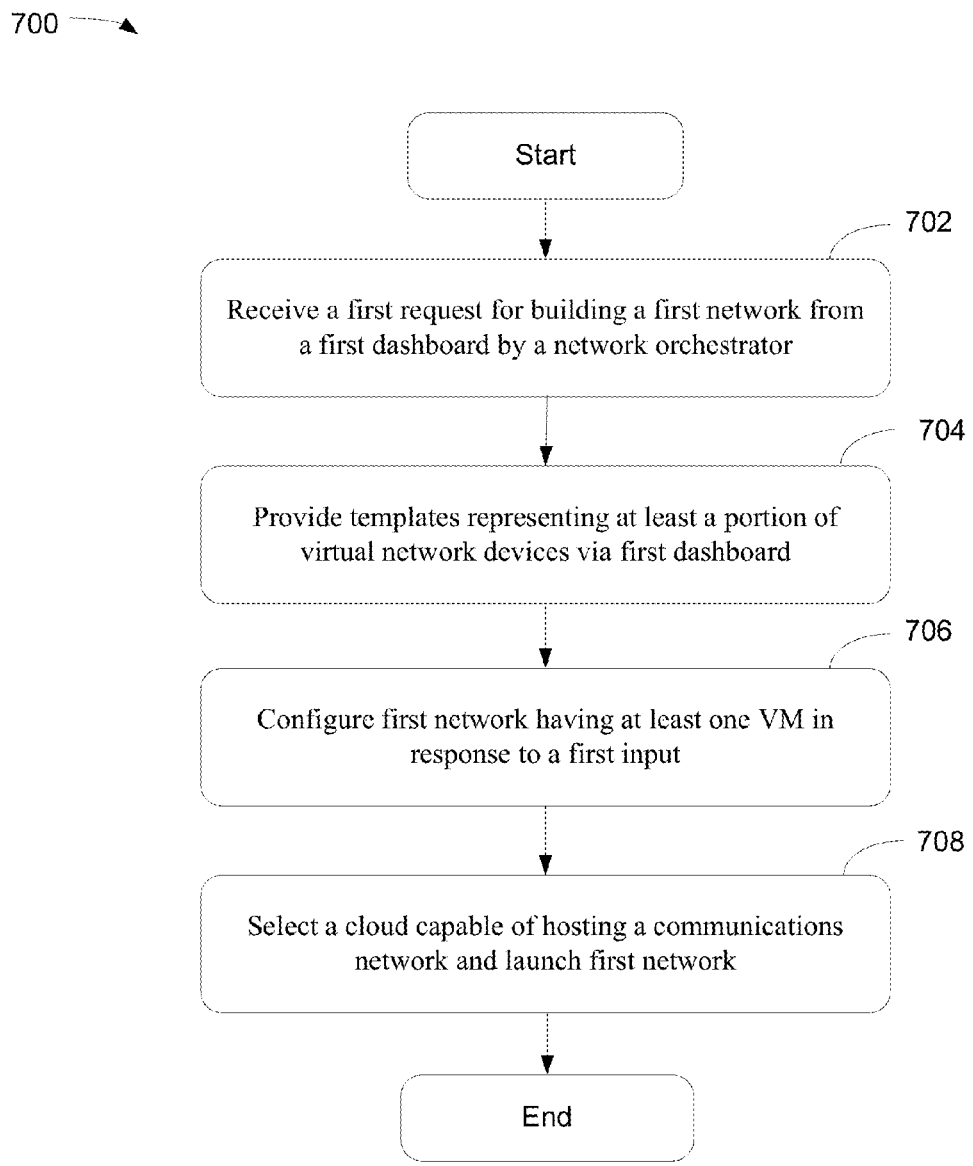
FIG. 7 is a flowchart illustrating an exemplary process of managing a virtual network using an orchestrator in accordance with one embodiment of the present invention.

FIG. 7 is a flowchart 700 illustrating an exemplary process of managing a virtual network using an orchestrator in accordance with one embodiment of the present invention. At block 702, a network orchestrator or orchestrator receives a message or request from a subscriber via a dashboard connected through a communication network. The received message requests to build or establish a virtual network. The virtual network, for example, may include VMs and/or physical machines.

At block 704, multiple templates representing at least a portion of virtual network devices or components are provided or posted on the dashboard. In one aspect, the dashboard displays a list of icons representing virtual router, virtual database, virtual switch, and/or virtual connection. The dashboard may also display a constructed VN as one of the listed icons whereby it can be cloned or duplicated.

At block 706, the process configures or constructs a VN containing one or more VMs configured to perform networking related functions in accordance with input entered by a user or subscriber. A user is allowed to access at least a portion of templates hosted by the orchestrator to build a network containing at least one VM performing a network function and/or a physical machine performing a network function. It should be noted that either a private cloud, public cloud, or hybrid cloud may be used to construct a VN.

At block 708, after selecting a cloud that can be either private or public cloud, the VN is launched utilizing at least a portion of the resource in the selected cloud. A predefined group of users is permitted to clone or copy the VN. In one aspect, after receiving a second request for building a second VN via a second dashboard by the orchestrator via a second communication network, multiple templates representing virtual network devices are provided to the second user via the second dashboard. The second network or second VN is subsequently configured or constructed in response to the input entered by the second user. Note that a cloud generally can host multiple VNs using multiple VMs.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for building a network, comprising:
receiving at an orchestrator from a first dashboard via a first communications network a request for building a first network;
providing to the first dashboard for display to a first user a plurality of templates including a virtual network and router each representing a different virtual machine (VM) for performing a network function;
receiving at the orchestrator from the first dashboard via the first communications network selections by the first user of at least two of the templates; and
configuring, by the orchestrator, the first network having at least one VM corresponding to one of the received templates selected by the first user and another VM corresponding to another of the received templates selected by the first user, wherein the configuring the first network includes selecting, from among a plurality of available network clouds, a network cloud capable of hosting the first network, launching the first network utilizing at least a portion of resources in the selected network cloud, and permitting a predefined group of users to clone the first network after the first network is built via one or more templates.

2. The method of claim 1, further comprising:
receiving at the orchestrator from a second dashboard via a second communications network a request for building a second network; and
providing to the second dashboard for display to a second user the plurality of templates.

3. The method of claim 2, further comprising:
receiving at the orchestrator from the second dashboard via the second communications network selections by the second user of at least two of the templates; and
configuring, by the orchestrator, the second network having at least one VM corresponding to one of the received templates selected by the second user and another VM corresponding to another of the received templates selected by the second user.

4. The method of claim 1, where configuring the first network includes building one of the VMs in a private network cloud and another of the VMs in a public network cloud.

5. The method of claim 1, where permitting a predefined group of users to clone the first network comprises providing a template representing the first network as a selection option for display on dashboards associated with the users in the group.

6. The method of claim 5, where permitting a predefined group of users to clone the first network further includes allowing one of the users in the group to copy the first network by selecting the representation of the first network on the dashboard associated with the one of the users.

7. The method of claim 1, where:
the plurality of templates includes a template representing a physical network device for performing a network function;
receiving network selections by the first user comprises receiving the template representing the physical device; and
the configuring the first network comprises configuring the first network with the physical device included to perform its network function.

8. The method of claim 1 further comprising:
providing to a second dashboard for display to a second user a virtual network (VN) template representing a VN comprising a plurality of interconnected VMs each configured to perform a network function;
receiving at the orchestrator from the second dashboard via a second communications network selection by a second user of the VN template; and
configuring, by the orchestrator, an operational instance of the VN represented by the selected VN template.

9. The method of claim 8, where the configuring an operational instance of the VN comprises configuring the operational instance of the VN at least in part in a network cloud.

10. The method of claim 8, where the plurality of interconnected VMs of the VN represented by the VN template include at least two of the following: a virtual router, a virtual database, a virtual switch, and a virtual connection.

11. The method of claim 1 further comprising, in response to receiving the request for building the first network, sending from the orchestrator to the first dashboard via the first communications network the templates.

12. The method of claim 1, where each VM represented by one of the templates performs a unique network function with respect to the VMs represented by the other templates.

13. A communication network having virtual machines ("VMs"), comprising:
a first private network cloud able to provide network services to a plurality of users, the first private network cloud configured to contain a plurality of servers and at least one end host manager ("ehm") situated in one of the plurality of servers;
a public network cloud coupled to the first private network cloud and configured to provide cloud computing service to remote users; and
an orchestrator coupled to the first private network cloud, the public network cloud, and the plurality of users, wherein the orchestrator is able to receive a request for creating a virtual network ("VN") with at least two selected templates from one of the plurality of users, the orchestrator configured to launch a first VM and a second VM organized in accordance with the VN in the public network cloud, wherein the first VM corresponds to one of the at least two selected templates and the second VM corresponds to another one of the at least two selected templates, wherein templates include a virtual network and router and the orchestrator includes dashboards configured to communicate with subscribers via a network and is able to provide a plurality of icons on the dashboards, wherein the plurality of icons is a set of templates representing a plurality of network devices.

14. The network of claim 13, wherein the orchestrator is able to assist establishing a virtual network based on at least a portion of the templates in response to input from the subscriber via the dashboard.

15. The network of claim 13, wherein the public cloud is able to provide cloud computing to facilitate VMs based on user's input.

16. The network of claim 13, further includes a second private cloud coupled to the orchestrator and able to provide cloud computing using at least one VM and at least one physical server situated in the second private network cloud.

17. The network of claim 13, wherein the orchestrator is configured to allowing one of the plurality of subscribers to clone an established network containing a group of VMs operating in one or more clouds.

* * * * *